US011942105B2

(12) United States Patent
Shin et al.

(10) Patent No.: US 11,942,105 B2
(45) Date of Patent: Mar. 26, 2024

(54) ELECTRONIC DEVICE AND METHOD FOR DETERMINING ABNORMAL NOISE

(71) Applicant: Samsung Electronics Co., Ltd., Suwon-si (KR)

(72) Inventors: Hoseon Shin, Suwon-si (KR); Chulmin Lee, Suwon-si (KR); Changwoo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/664,025

(22) Filed: May 18, 2022

(65) Prior Publication Data

US 2022/0277758 A1 Sep. 1, 2022

Related U.S. Application Data

(63) Continuation of application No. PCT/KR2020/010132, filed on Jul. 31, 2020.

(30) Foreign Application Priority Data

Nov. 18, 2019 (KR) ........................ 10-2019-0147429

(51) Int. Cl.

*G10L 21/0232* (2013.01)
*G10L 25/78* (2013.01)
*G10L 25/84* (2013.01)

(52) U.S. Cl.

CPC .......... *G10L 21/0232* (2013.01); *G10L 25/84* (2013.01); *G10L 2025/783* (2013.01)

(58) Field of Classification Search

CPC ................. G10L 21/0232; G10L 25/84; G10L 2025/783; G10L 21/0216; G10L 25/78; G10L 19/26

See application file for complete search history.

(56) References Cited

U.S. PATENT DOCUMENTS 5,754,973 A 5/1998 Akune
6,044,338 A 3/2000 Akune
(Continued)

FOREIGN PATENT DOCUMENTS

JP H04-245300 A 9/1992
JP 2014123011 A 7/2014
KR 10-2009-0123396 A 12/2009

OTHER PUBLICATIONS

International Search Report and Written Opinion of the International Searching Authority dated Nov. 6, 2020, in connection with International Application No. PCT/KR2020-010132, 9 pages.
(Continued)

*Primary Examiner* — Daniel C Washburn
*Assistant Examiner* — Athar N Pasha

(57) ABSTRACT

An electronic device includes an input device, a processor, and a memory The processor is configured to identify a first filter value of a first signal received from the input device. The processor is configured to receive a second signal after a first time elapses after the first signal is received. The processor is configured to receive a third signal after a second time elapses after the second signal is received. The processor is configured to compare a level of the second signal with a first threshold value for each of the at least one unit section of the second signal. The processor is configured to identify first information indicating that abnormal noise is present in a first section of the second signal. The processor is configured to perform filtering on the third signal based on the first filter value of the first signal according to the first information.

8 Claims, 10 Drawing Sheets

(56) References Cited

U.S. PATENT DOCUMENTS

| | | | |
|---|---|---|---|
| 8,005,238 | B2 | 8/2011 | Tashev et al. |
| 8,185,389 | B2 | 5/2012 | Yu et al. |
| 8,275,616 | B2 | 9/2012 | Jung et al. |
| 8,818,002 | B2 | 8/2014 | Tashev et al. |
| 8,930,196 | B2 | 1/2015 | Jung et al. |
| 9,426,592 | B2 | 8/2016 | Skoglund et al. |
| 2009/0043577 | A1 * | 2/2009 | Godavarti ............... G10L 21/02 707/999.1 |
| 2010/0153104 | A1 * | 6/2010 | Yu ....................... G10L 21/0208 704/E15.039 |
| 2014/0180682 | A1 | 6/2014 | Shi et al. |
| 2014/0226829 | A1 | 8/2014 | Skoglund et al. |
| 2017/0098457 | A1 * | 4/2017 | Zad Issa ............... G10L 21/034 |

OTHER PUBLICATIONS

Kang, "Damaged digitized audio record restoration technology research trend," 5th National Archives of Records Preservation Technology Joint Academic Seminar, Sep. 2012, 50 pages.
Office Action dated Dec. 18, 2023, in connection with Korean Patent Application No. 10-2019-0147429, 9 pages.

* cited by examiner

ELECTRONIC DEVICE AND METHOD FOR DETERMINING ABNORMAL NOISE

CROSS-REFERENCE TO RELATED APPLICATIONS

This application is a Bypass Continuation of International Application No. PCT/KR2020/010132, filed Jul. 31, 2020, which claims priority to Korean Patent Application No. 10-2019-0147429, filed Nov. 18, 2019, the disclosures of which are herein incorporated by reference in their entirety.

BACKGROUND

1. Field

Embodiments disclosed in this specification relate to a technology for determining abnormal noise and preprocessing a signal including the abnormal noise.

2. Description of Related Art

In addition to a conventional input method using a keyboard or a mouse, electronic devices have recently supported various input methods such as a voice input. For example, the electronic devices such as smart phones or tablet PCs may receive a user voice and then may provide a service that performs an operation corresponding to the received user voice.

The speech recognition service is being developed based on a technology for processing a natural language. The technology for processing a natural language refers to a technology that grasps the intent of a user input (utterance) and generates the result matched with the intent to provide the user with the service.

In the meantime, preprocessing may be performed on a signal received through an input device. For example, the preprocessing for removing noise and improving sound quality may be performed on the signal received through the input device, and thus a signal having improved sound quality may be transmitted to an intelligence server or the like.

SUMMARY

When a filter value capable of being applied to a signal including abnormal noise is applied to a normal signal received after a signal including abnormal noise is received through an input device, effective components (e.g., voice components) included in the normal signal may be removed.

For example, the abnormal noise may be noise that is introduced at a very high intensity throughout the entire frequency band as compared to normal noise, which is caused by a physical contact with an input device, strong wind around the input device, or strong noise around the input device.

According to an embodiment disclosed in this specification, it is possible to determine a filter value to be applied to a signal received through the input device after a signal including the abnormal noise is received, by determining whether a signal received through the input device includes abnormal noise.

According to an embodiment disclosed in this specification, an electronic device may include an input device, a processor, and a memory operatively connected to the input device and the processor. The memory may store instructions that, when executed, cause the processor to identify a first filter value of a first signal received from the input device, to receive a second signal, which is received after a first time elapses after the first signal is received, from the input device, to receive a third signal, which is received after a second time elapses after the second signal is received, from the input device, to compare a level of the second signal with a first threshold value for each unit section of the second signal, to identify first information indicating that abnormal noise is present in a first section of the second signal, based on a fact that a level of a portion of the second signal corresponding to the first section including the at least one unit section is greater than the first threshold value, and to perform filtering based on the first filter value of the first signal on the third signal based on the first information.

Furthermore, according to an embodiment disclosed in this specification, an abnormal noise determining method of an electronic device may include identifying a first filter value of a first signal received from the electronic device, receiving a second signal, which is received after a first time elapses after the first signal is received, and a third signal, which is received after a second time elapses after the second signal is received, comparing a level of the second signal with a first threshold value for each unit section of the second signal, identifying first information indicating that abnormal noise is present in a first section of the second signal, based on a fact that a level of a portion of the second signal corresponding to the first section including the at least one unit section is greater than the first threshold value, and performing filtering based on the first filter value of the first signal on the third signal based on the first information.

Moreover, according to an embodiment disclosed in this specification, a computer-readable storage medium may store instructions, when executed by an electronic device, cause the electronic device to identify a first filter value of a first signal received from the electronic device, to receive a second signal, which is received after a first time elapses after the first signal is received, and a third signal, which is received after a second time elapses after the second signal is received, to compare a level of the second signal with a first threshold value for each unit section of the second signal, to identify first information indicating that abnormal noise is present in a first section of the second signal, based on a fact that a level of a portion of the second signal corresponding to the first section including the at least one unit section is greater than the first threshold value, and to perform filtering based on the first filter value of the first signal on the third signal based on the first information.

According to an embodiment disclosed in this specification, filtering capable of removing noise and improving sound quality may be performed on a signal received through an input device after a signal including abnormal noise is received, by determining whether the signal received through the input device includes abnormal noise.

Besides, a variety of effects directly or indirectly understood through the specification may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, the same or similar components will be marked by the same or similar reference signs.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein may be variously made without departing from the scope and spirit of the disclosure.

Figure 1A:
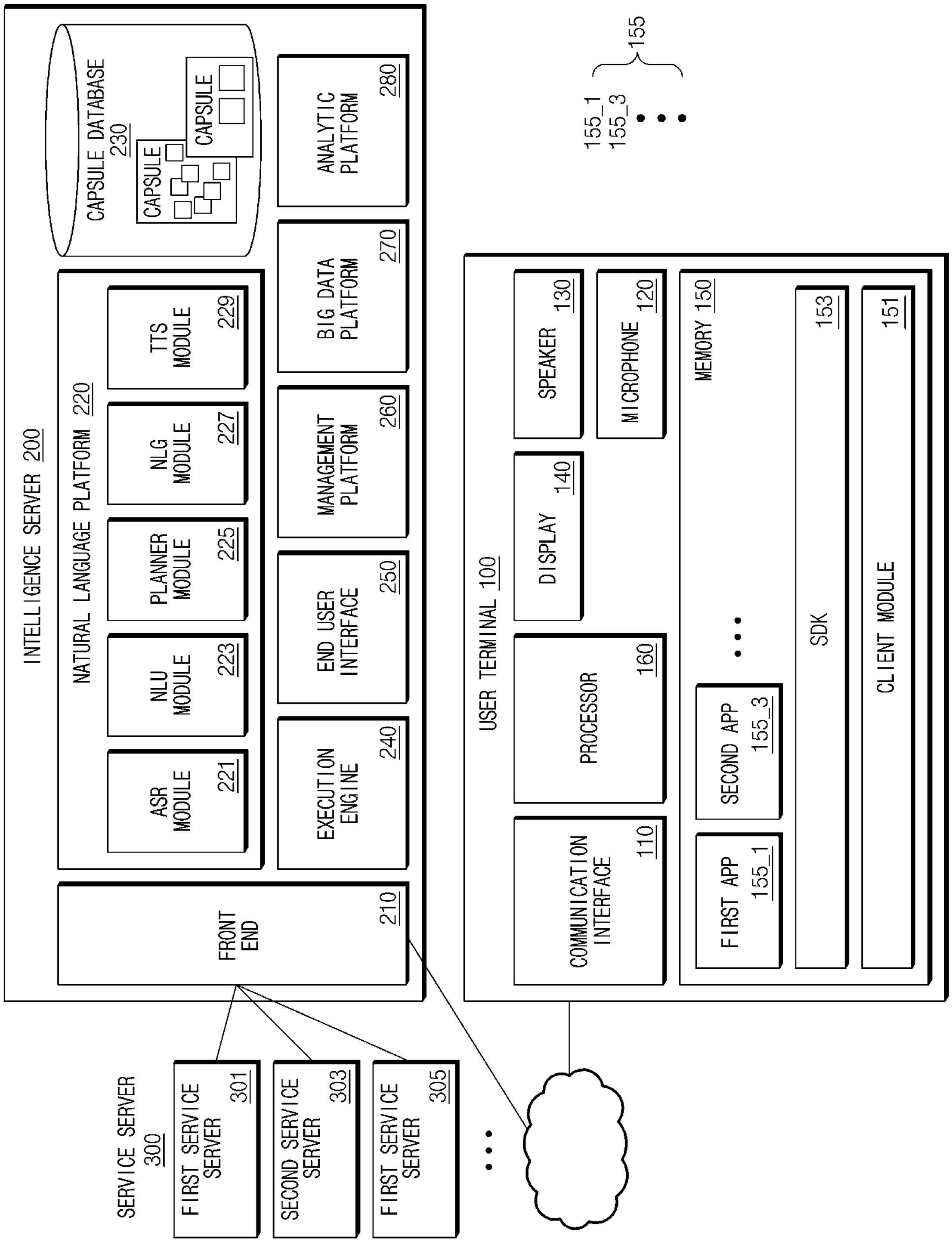
FIG. 1A illustrates a block diagram of an integrated intelligence system, according to an embodiment of this disclosure.

FIG. 1A illustrates a block diagram of an integrated intelligence system, according to an embodiment of this disclosure.

Referring to FIG. 1A, an integrated intelligence system according to an embodiment may include a user terminal 100, an intelligence server 200, and a service server 300.

The user terminal 100 according to an embodiment may be a terminal device (or an electronic device) capable of connecting to Internet, and may be, for example, a mobile phone, a smartphone, a personal digital assistant (PDA), a notebook computer, TV, a household appliance, a wearable device, a HMD, or a smart speaker.

According to the illustrated embodiment, the user terminal 100 may include a communication interface 110, a microphone 120, a speaker 130, a display 140, a memory 150, or a processor 160. The listed components may be operatively or electrically connected to one another.

The communication interface 110 according to an embodiment may be connected to an external device and may be configured to transmit or receive data to or from the external device. The microphone 120 according to an embodiment may receive a sound (e.g., a user utterance) to convert the sound into an electrical signal. The speaker 130 according to an embodiment may output the electrical signal as a sound (e.g., voice). The display 140 according to an embodiment may be configured to display an image or a video. The display 140 according to an embodiment may display the graphic user interface (GUI) of the running app (or an application program).

The memory 150 according to an embodiment may store a client module 151, a software development kit (SDK) 153, and a plurality of applications (apps) 155. The client module 151 and the SDK 153 may constitute a framework (or a solution program) for performing general-purposed functions. Furthermore, the client module 151 or the SDK 153 may constitute the framework for processing a voice input.

In the memory 150 according to an embodiment, the plurality of apps 155 may be programs for performing the specified function. According to an embodiment, the plurality of apps 155 may include a first app 155_1 and a second app 155_3. According to an embodiment, each of the plurality of apps 155 may include a plurality of actions for performing a specified function. For example, the apps may include an alarm app, a message app, and/or a schedule app. According to an embodiment, the plurality of apps 155 may be executed by the processor 160 to sequentially execute at least part of the plurality of actions.

According to an embodiment, the processor 160 may control overall operations of the user terminal 100. For example, the processor 160 may be electrically connected to the communication interface 110, the microphone 120, the speaker 130, and the display 140 to perform specified operations.

Moreover, the processor 160 according to an embodiment may execute a program stored in the memory 150 to perform a specified function. For example, according to an embodiment, the processor 160 may execute at least one of the client module 151 or the SDK 153 so as to perform a following operation for processing a voice input. The processor 160 may control operations of the plurality of apps 155 via the SDK 153. The following operation described as an operation of the client module 151 or the SDK 153 may be executed by the processor 160.

According to an embodiment, the client module 151 may receive a voice input. For example, the client module 151 may receive a voice signal corresponding to a user utterance detected through the microphone 120. The client module 151 may transmit the received voice input to the intelligence server 200. The client module 151 may transmit state information of the user terminal 100 to the intelligence server 200 together with the received voice input. For example, the state information may be execution state information of an app.

According to an embodiment, the client module 151 may receive a result corresponding to the received voice input. For example, when the intelligence server 200 is capable of calculating the result corresponding to the received voice input, the client module 151 may receive the result corresponding to the received voice input. The client module 151 may display the received result on the display 140.

According to an embodiment, the client module 151 may receive a plan corresponding to the received voice input. The client module 151 may display, on the display 140, a result of executing a plurality of actions of an app depending on the plan. For example, the client module 151 may sequentially display the result of executing the plurality of actions on a display. For another example, the user terminal 100 may display only a part of results (e.g., a result of the last action) of executing the plurality of actions, on the display.

According to an embodiment, the client module 151 may receive a request for obtaining information necessary to calculate the result corresponding to a voice input, from the intelligence server 200. According to an embodiment, the client module 151 may transmit the necessary information to the intelligence server 200 in response to the request.

According to an embodiment, the client module 151 may transmit information about the result of executing a plurality of actions depending on the plan to the intelligence server 200. The intelligence server 200 may identify that the received voice input is correctly processed, using the result information.

According to an embodiment, the client module 151 may include a speech recognition module. According to an embodiment, the client module 151 may recognize a voice input for performing a limited function, via the speech recognition module. For example, the client module 151 may launch an intelligence app that processes a voice input for performing an organic action, via a specified input (e.g., wake up!).

According to an embodiment, the intelligence server 200 may receive information associated with a user's voice input from the user terminal 100 over a communication network. According to an embodiment, the intelligence server 200 may convert data associated with the received voice input to text data. According to an embodiment, the intelligence server 200 may generate a plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligence server 200 may transmit a result according to the generated plan to the user terminal 100 or may transmit the generated plan to the user terminal 100. According to an embodiment, the user terminal 100 may display the result according to the plan, on a display (such as the display 140). According to an embodiment, the user terminal 100 may display a result of executing the action according to the plan, on the display (such as the display 140).

The intelligence server 200 according to an embodiment may include a front end 210, a natural language platform 220, a capsule database (DB) 230, an execution engine 240, an end user interface 250, a management platform 260, a big data platform 270, or an analytic platform 280.

According to an embodiment, the front end 210 may receive a voice input received from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech module (TTS) module 229.

According to an embodiment, the ASR module 221 may convert the voice input received from the user terminal 100 into text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 225 may generate the plan by using a parameter and the intent that is determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or a result value output by the execution of the plurality of actions. The parameter and the result value may be defined as a concept of a specified form (or class). As such, the plan may include the plurality of actions and a plurality of concepts, which are determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine an execution sequence of the plurality of actions, based on the parameters necessary to perform the plurality of actions and the result output by the execution of the plurality of actions. Accordingly, the planner module 225 may generate a plan including information (e.g., ontology) about the relationship between the plurality of actions and the plurality of concepts. The planner module 225 may generate the plan, using information stored in the capsule DB 230 storing a set of relationships between concepts and actions.

According to an embodiment, the NLG module 227 may change specified information into information in a text form. The information changed to the text form may be in the form of a natural language speech. The TTS module 229 according to an embodiment may change information in the text form to information in a voice form.

According to an embodiment, all or part of the functions of the natural language platform 220 may be also implemented in the user terminal 100.

The capsule DB 230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 230 may store the plurality of capsules in a form of a concept action network (CAN). According to an embodiment, the plurality of capsules may be stored in the function registry included in the capsule DB 230.

The capsule DB 230 may include a strategy registry that stores strategy information necessary to determine a plan corresponding to a voice input. When there are a plurality of plans corresponding to the voice input, the strategy information may include reference information for determining one plan. According to an embodiment, the capsule DB 230 may include a follow-up registry that stores information of the follow-up action for suggesting a follow-up action to the user in a specified context. For example, the follow-up action may include a follow-up utterance. According to an embodiment, the capsule DB 230 may include a layout registry storing layout information of information output via the user terminal 100. According to an embodiment, the capsule DB 230 may include a vocabulary registry storing vocabulary information included in capsule information. According to an embodiment, the capsule DB 230 may include a dialog registry storing information about dialog (or interaction) with the user. The capsule DB 230 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 230 according to an embodiment may be also implemented in the user terminal 100.

According to an embodiment, the execution engine 240 may calculate a result by using the generated plan. The end user interface 250 may transmit the calculated result to the user terminal 100. Accordingly, the user terminal 100 may receive the result and may provide the user with the received result. According to an embodiment, the management platform 260 may manage information used by the intelligence server 200. According to an embodiment, the big data platform 270 may collect data of the user. According to an embodiment, the analytic platform 280 may manage quality of service (QoS) of the intelligence server 200. For example, the analytic platform 280 may manage the component and processing speed (or efficiency) of the intelligence server 200.

According to an embodiment, the service server 300 may provide the user terminal 100 with a specified service (e.g., ordering food or booking a hotel). According to an embodiment, the service server 300 may be a server operated by the third party. According to an embodiment, the service server 300 may provide the intelligence server 200 with information for generating a plan corresponding to the received voice input. The provided information may be stored in the capsule DB 230. Furthermore, the service server 300 may provide the intelligence server 200 with result information according to the plan.

In the above-described integrated intelligence system, the user terminal 100 may provide the user with various intelligent services in response to a user input. The user input may include, for example, an input through a physical button, a touch input, or a voice input.

According to an embodiment, the user terminal 100 may provide a speech recognition service via an intelligence app (or a speech recognition app) stored therein. In this case, for example, the user terminal 100 may recognize a user utterance or a voice input, which is received via the microphone, and may provide the user with a service corresponding to the recognized voice input.

According to an embodiment, the user terminal 100 may perform a specified action, based on the received voice input, independently, or together with the intelligence server and/or the service server. For example, the user terminal 100 may launch an app corresponding to the received voice input and may perform the specified action via the executed app.

In certain embodiments, when providing a service together with the intelligence server 200 and/or the service server, the user terminal 100 may detect a user utterance by using the microphone 120 and may generate a signal (or voice data) corresponding to the detected user utterance. The user terminal may transmit the voice data to the intelligence server 200 by using the communication interface 110.

According to an embodiment, the intelligence server 200 may generate a plan for performing a task corresponding to the voice input or the result of performing an action depending on the plan, as a response to the voice input received from the user terminal 100. For example, the plan may include a plurality of actions for performing a task corresponding to the voice input of the user and a plurality of concepts associated with the plurality of actions. The concept may define a parameter to be input upon executing the plurality of actions or a result value output by the execution of the plurality of actions. The plan may include relationship information between the plurality of actions and the plurality of concepts.

According to an embodiment, the user terminal 100 may receive the response by using the communication interface

110. The user terminal 100 may output the voice signal generated in the user terminal 100 to the outside by using the speaker 130 or may output an image generated in the user terminal 100 to the outside by using the display 140.

Figure 1B:
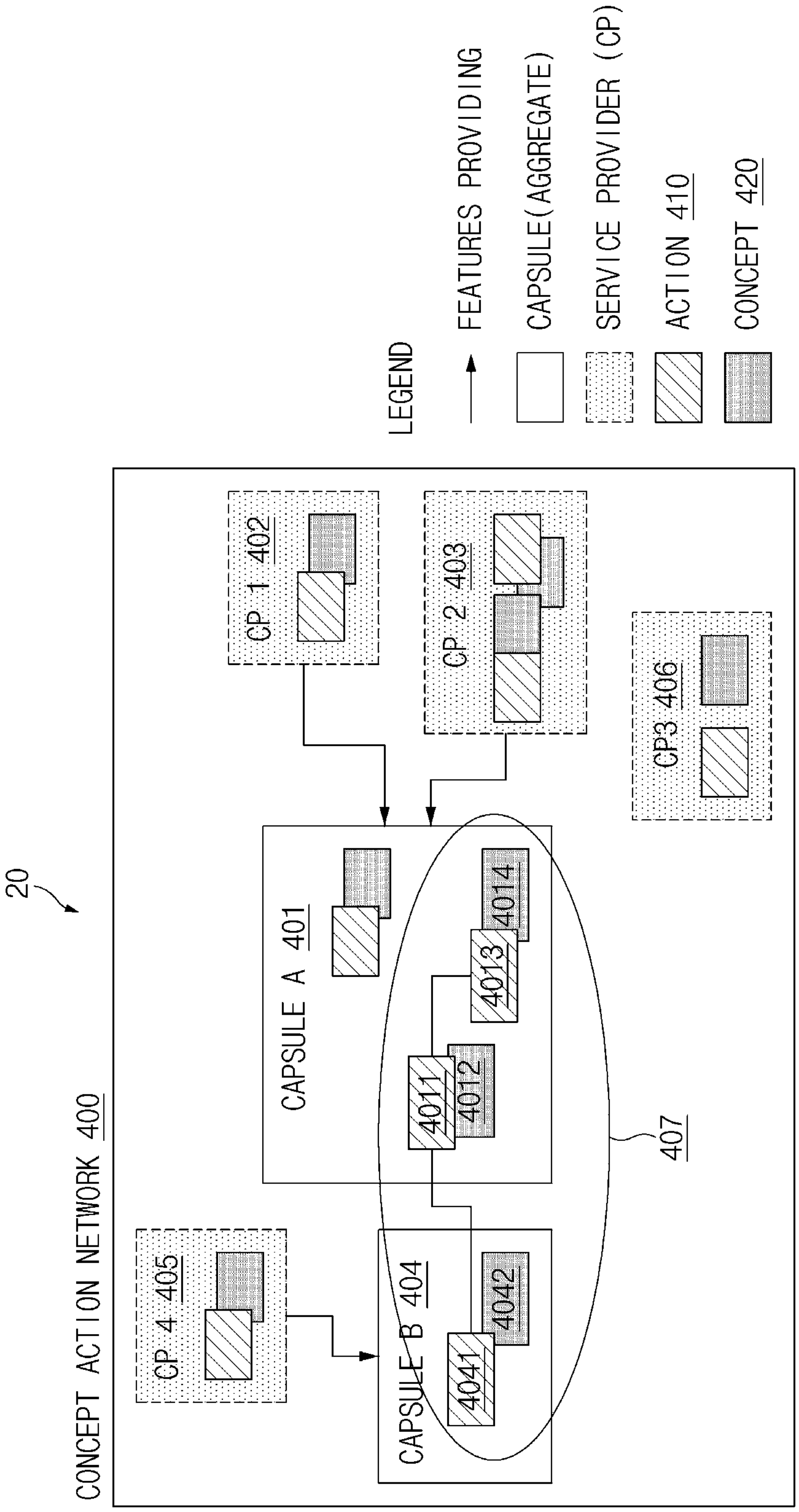
FIG. 1B illustrates a diagram in which relationship information between a concept and an action is stored in a database, according to an embodiment of this disclosure.

FIG. 1B illustrates a diagram in which relationship information between a concept and an action is stored in a database, according to various embodiments of this disclosure.

A capsule database (e.g., the capsule DB 230) of the intelligence server 200 may store a capsule in the form of a CAN. The capsule DB may store an action for processing a task corresponding to a user's voice input and a parameter necessary for the action, in the CAN form.

The capsule DB may store a plurality capsules (a capsule A 401 and a capsule B 404) respectively corresponding to a plurality of domains (e.g., applications). According to an embodiment, one capsule (e.g., the capsule A 401) may correspond to one domain (e.g., a location (geo) or an application). Furthermore, at least one service provider (e.g., CP 1 402 or CP 2 403) for performing a function for a domain associated with the capsule may correspond to one capsule. According to an embodiment, the single capsule may include at least one or more actions 410 and at least one or more concepts 420 for performing a specified function.

The natural language platform 220 may generate a plan for performing a task corresponding to the received voice input, using the capsule stored in a capsule database. For example, the planner module 225 of the natural language platform may generate the plan by using the capsule stored in the capsule database. For example, a plan 407 may be generated by using actions 4011 and 4013 and concepts 4012 and 4014 of the capsule A 401 and an action 4041 and a concept 4042 of the capsule B 404.

Figure 1C:
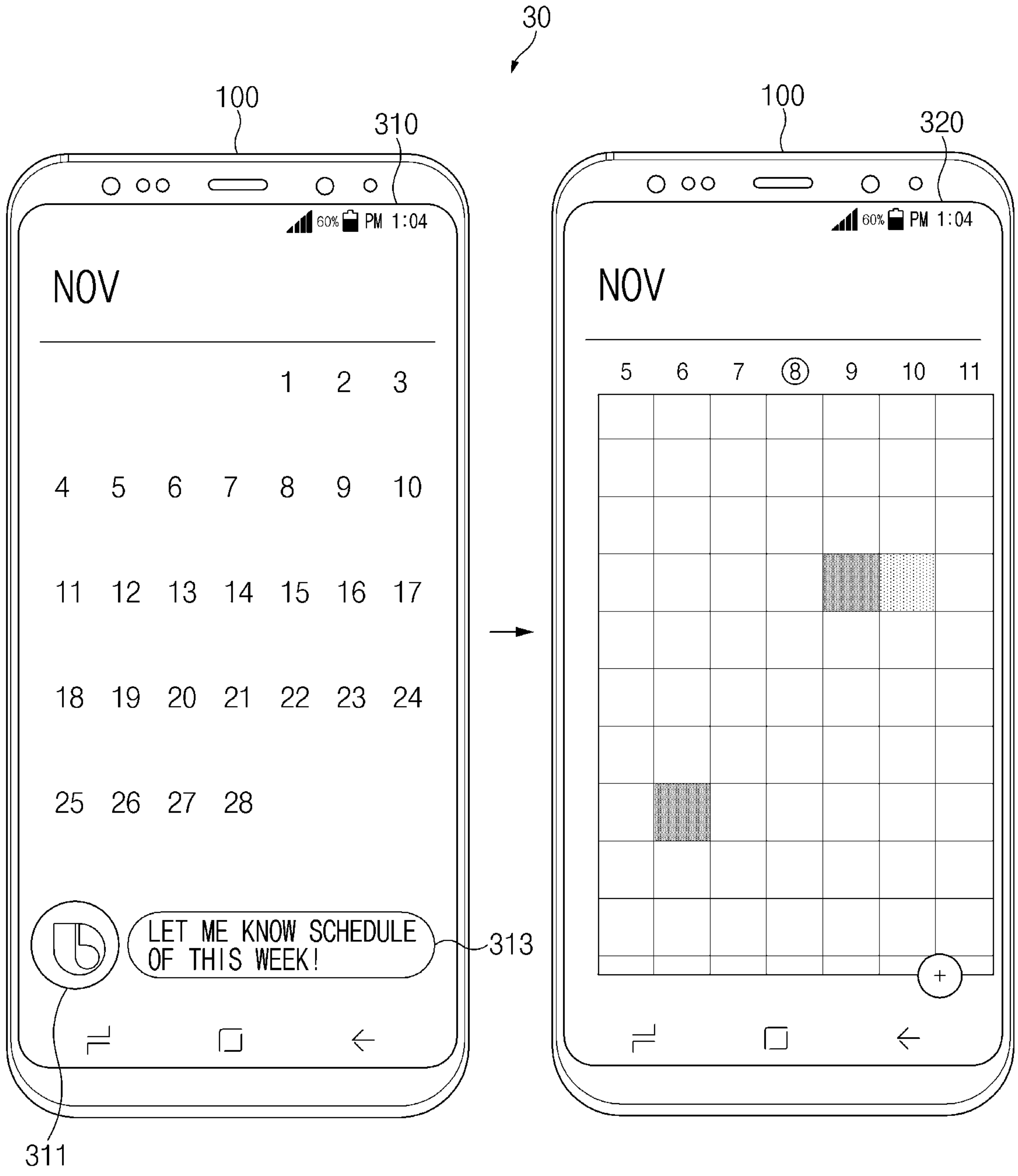
FIG. 1C illustrates a user terminal displaying a screen of processing a voice input received through an intelligence app, according to an embodiment of this disclosure.

FIG. 1C illustrates a screen in which a user terminal processes a voice input received through an intelligence app, according to an embodiment of this disclosure.

The user terminal 100 may execute an intelligence app to process a user input through the intelligence server 200.

According to an embodiment, on screen 310, when recognizing a specified voice input (e.g., wake up!) or receiving an input via a hardware key (e.g., a dedicated hardware key), the user terminal 100 may launch an intelligence app for processing a voice input. For example, the user terminal 100 may launch the intelligence app in a state where a schedule app is executed. According to an embodiment, the user terminal 100 may display an object (e.g., an icon) 311 corresponding to the intelligence app, on the display 140. According to an embodiment, the user terminal 100 may receive a voice input by a user utterance. For example, the user terminal 100 may receive a voice input saying that "let me know the schedule of this week!". According to an embodiment, the user terminal 100 may display a user interface (UI) 313 (e.g., an input window) of the intelligence app, in which text data of the received voice input is displayed, on a display.

According to an embodiment, on screen 320, the user terminal 100 may display a result corresponding to the received voice input, on the display. For example, the user terminal 100 may receive a plan corresponding to the received user input and may display 'the schedule of this week' on the display depending on the plan.

Figure 1D:
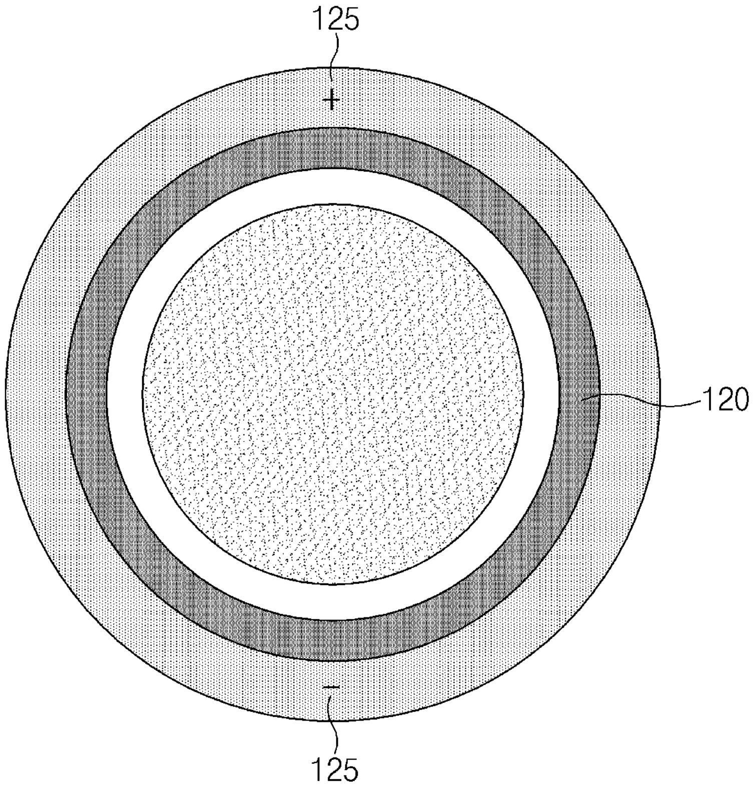
FIG. 1D illustrates a diagram describing a user terminal according to an embodiment of this disclosure.
Figure 1E:
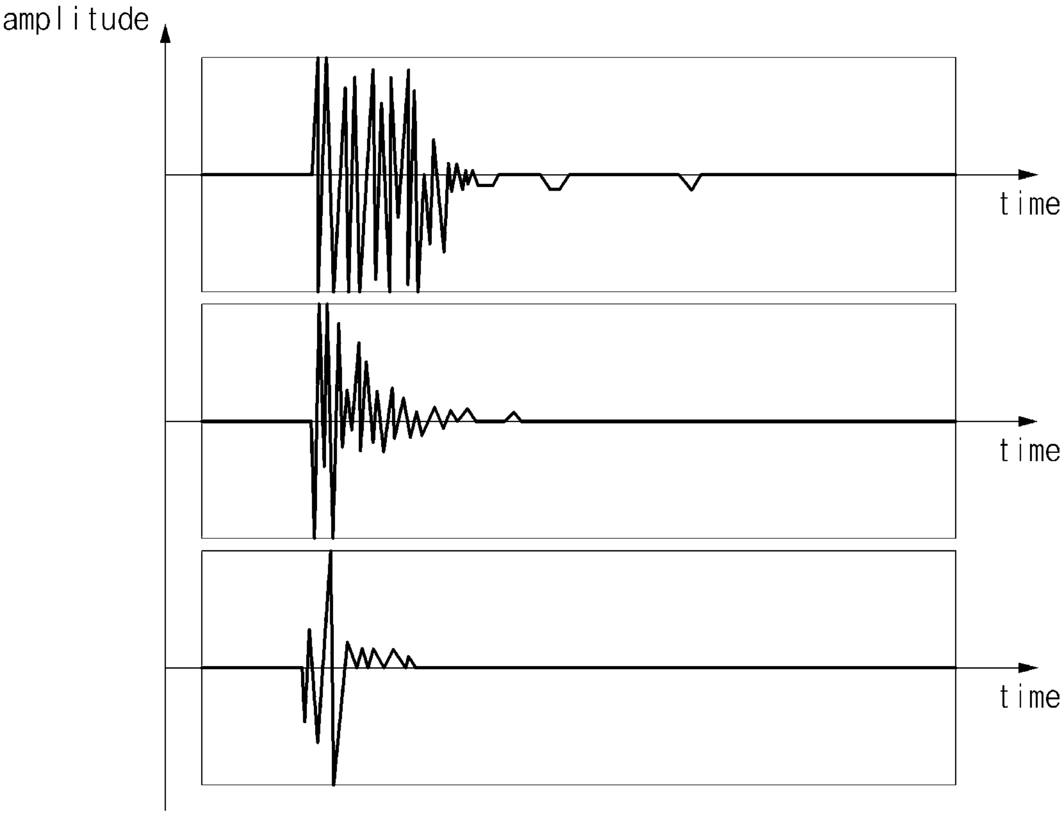
FIG. 1E illustrates an exemplary diagram of signals received by a microphone of a user terminal, according to an embodiment of this disclosure.

FIG. 1D illustrates a diagram describing a user terminal according to an embodiment of this disclosure. FIG. 1D may be a view illustrating a top surface of the user terminal 100. FIG. 1E illustrates an exemplary diagram of signals received by the microphone 120 of the user terminal 100, according to an embodiment of this disclosure. In FIG. 1E, the x-axis may indicate time, and the y-axis may indicate amplitude. Signals in FIG. 1E may be signals introduced into the plurality of microphones 120 of the user terminal 100, respectively.

Referring to FIGS. 1D and 1E, the user terminal 100 according to an embodiment may include the microphone 120 and/or a touch unit 125, which is positioned on the top surface thereof. Content played by the user terminal 100 and/or functions of the user terminal 100 may be controlled in response to the manipulation of the touch unit 125 on the top surface of the user terminal 100.

In certain embodiments, the plurality of microphones 120 included in the user terminal 100 may be present. For example, when a signal including abnormal noise is introduced through the microphone 120 by the user in response to the manipulation of the touch unit 125, each signal in FIG. 1E may be preprocessed by the user terminal 100 before being transmitted to the intelligence server 200. The preprocessing by the user terminal 100 will be described with reference to FIG. 2 below.

Hereinafter, an electronic device 501 (e.g., the user terminal 100 of FIG. 1A) according to an embodiment disclosed in the specification will be described with reference to FIG. 2. For clarity of description, details the same as the above-described details are briefly described or omitted.

Figure 2:
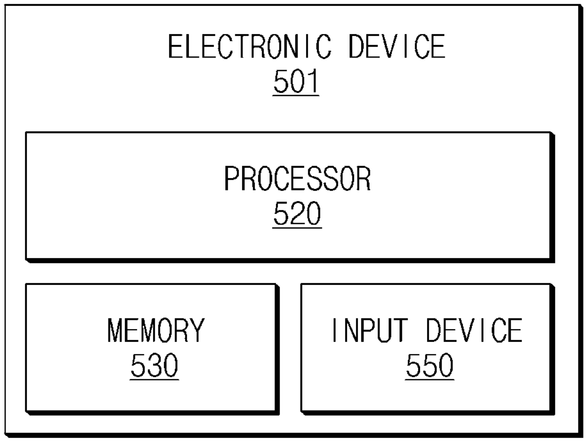
FIG. 2 illustrates a block diagram of an electronic device, according to an embodiment of this disclosure.

FIG. 2 illustrates a block diagram of the electronic device 501 according to an embodiment of this disclosure.

Referring to FIG. 2, the electronic device 501 may include a processor 520 (e.g., the processor 160 of FIG. 1A), a memory 530 (e.g., the memory 150 of FIG. 1A), and an input device 550 (e.g., the microphone 120 in FIG. 1A).

The electronic device 501 according to various embodiments disclosed in the specification may be implemented with various types of devices. The electronic device 501 may include, for example, a portable communication device (e.g., a smartphone), a computer device, a portable multimedia device, a mobile medical appliance, a camera, a wearable device, or a home appliance. The electronic device 501 according to an embodiment of this specification may not be limited to the above-described devices.

The electronic device 501 may further include at least one of additional components in addition to the components illustrated in FIG. 2. For example, the electronic device 501 may include a communication module or a connection terminal for communicating with an external electronic device. According to an embodiment, the components of the electronic device 501 may be the same entities or may constitute separate entities.

In certain embodiments, the electronic device 501 may further include a circuit for calculating a probability value that a voice signal is present in a signal received from the input device 550. For example, the circuit for calculating the probability value may be included in the processor 520 or may be implemented with a separate circuit from the processor 520.

The memory 530 may store commands, information, or data associated with operations of components included in the electronic device 501. For example, the memory 530 may store instructions, when executed, that cause the processor 520 to perform various operations described in this specification.

According to an embodiment, the processor 520 may be operatively coupled to the memory 530, and the input device 550 to perform overall functions of the electronic device 501. For example, the processor 520 may include one or more processors. For example, the one or more processors may include an image signal processor (ISP), an application processor (AP), or a communication processor (CP).

The input device 550 may transmit, for example, a signal received from the outside to the processor 520. The signal received from the outside through the input device 550 may include not only a voice signal but also noise and/or abnormal noise.

According to an embodiment disclosed in this specification, an electronic device 501 may include an input device 550, a processor 520, and a memory 530 operatively connected to the input device 550 and the processor 520. The memory 530 may store instructions that, when executed, cause the processor 520 to identify a first filter value of a first signal received from the input device 550. The memory 530 may also store instructions that, when executed, cause the processor 520 to receive a second signal, which is received after a first time elapses after the first signal is received, from the input device 550. The memory 530 may further store instructions that, when executed, cause the processor 520 to receive a third signal, which is received after a second time elapses after the second signal is received, from the input device 550. Additionally, the memory 530 may store instructions that, when executed, cause the processor 520 to compare a level of the second signal with a first threshold value for each unit section of the second signal. The memory 530 may also store instructions that, when executed, cause the processor 520 to identify first information indicating that abnormal noise is present in a first section of the second signal, based on a fact that a level of a portion of the second signal corresponding to the first section including the at least one unit section is greater than the first threshold value. The memory 530 may further store instructions that, when executed, cause the processor 520 to perform filtering based on the first filter value of the first signal on the third signal based on the first information.

In certain embodiments, the instructions may cause the processor 520 to identify intensity of the portion of the second signal corresponding to the first section and to compare the level, which is the intensity of the portion of the second signal corresponding to the first section, with the first threshold value.

In certain embodiments, the instructions may cause the processor 520 to identify a probability value that the abnormal noise is present in the portion of the second signal corresponding to the first section, and to compare the level, which is the probability value, with the first threshold value.

In certain embodiments, the instructions may cause the processor 520 to identify a probability value that the abnormal noise is present in the first section of the second signal, as the first information based on a fact that the level of the portion of the second signal corresponding to the first section is greater than the first threshold value.

In certain embodiments, the instructions may cause the processor 520 to identify a probability value that a voice signal is present in the second signal, to compare the probability value with a second threshold value, and to identify the first information based on a fact that the level of the portion of the second signal corresponding to the first section is greater than the first threshold value and the probability value is less than the second threshold value.

In certain embodiments, the instructions may cause the processor 520 to perform filtering based on a second filter value of the second signal on the third signal based on a fact that the level of the portion of the second signal corresponding to the first section is less than the first threshold value.

In certain embodiments, the instructions may cause the processor 520 to perform filtering based on the first filter value on the first signal.

In certain embodiments, the processor 520 may receive an input signal from the input device. The first signal may be one portion of the input signal received during the first time from a first time point. The second signal may be one portion of the input signal, which is received during the second time from a second time point that is after the first time elapses, from the first time point. The third signal may be one portion of the input signal received from a third time point that is after the second time elapses from the second time point.

Hereinafter, an operation of an electronic device (e.g., the electronic device 501 of FIG. 2) according to an embodiment disclosed in this specification will be described with reference to FIGS. 3, 4, and 5. For clarity of description, details the same as the above-described details may be briefly described or omitted.

Hereinafter, it is assumed that the electronic device 501 of FIG. 2 performs a process of FIG. 3. The operation described as being performed by the electronic device 501 may be implemented with instructions capable of being performed (or executed) by the processor 520 of the electronic device 501. The instructions may be stored in, for example, a computer-readable recording medium or the memory 530 of the electronic device 501 illustrated in FIG. 2.

Figure 3:
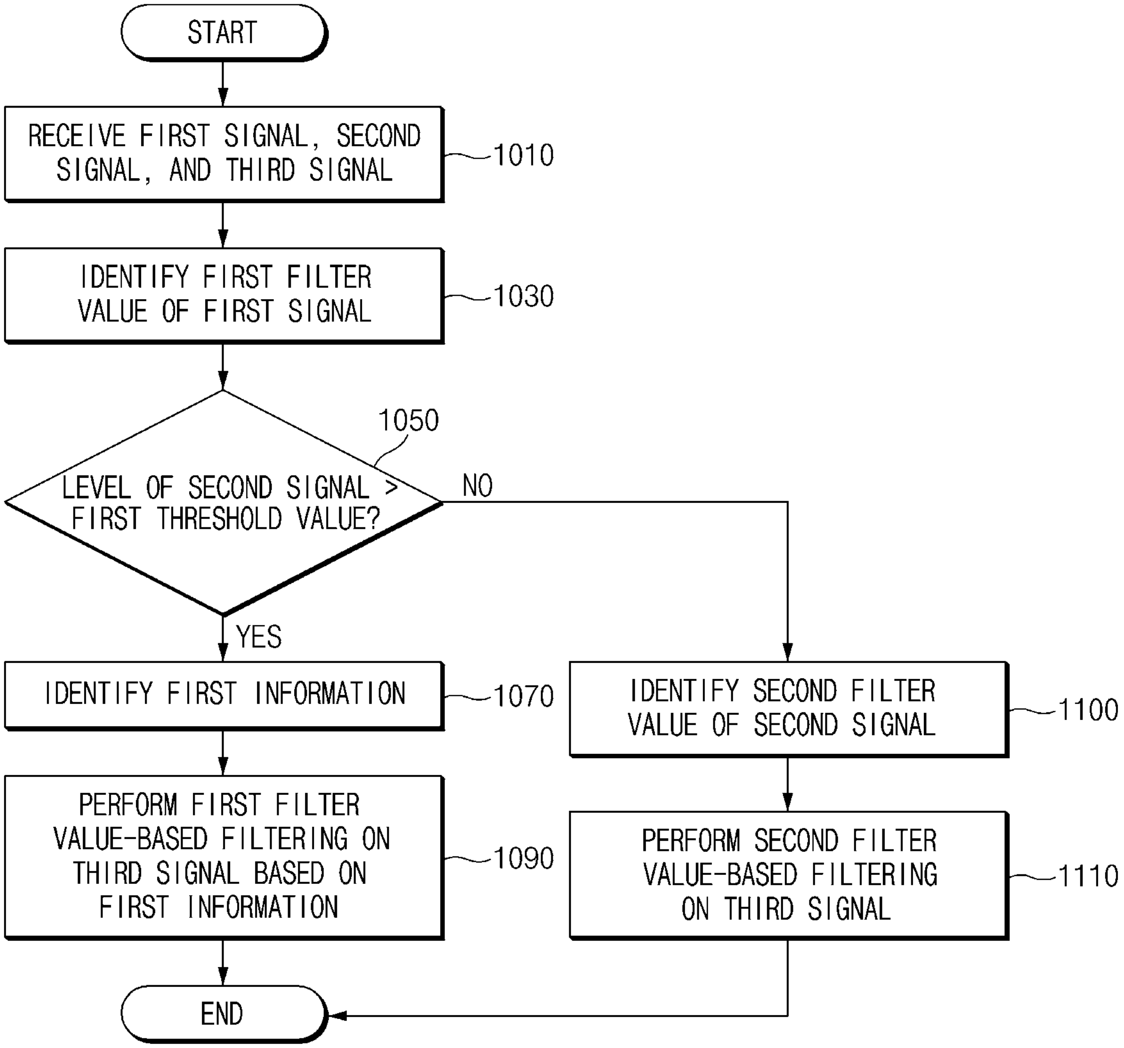
FIG. 3 illustrates a flowchart of an operation according to an embodiment of this disclosure.

FIG. 3 illustrates a flowchart of operation according to an embodiment of this disclosure. FIG. 4 illustrates a diagram describing a first signal, a second signal, and a third signal according to an embodiment disclosed in the specification. FIG. 5 illustrates a diagram describing a unit section and a first section of the second signal of FIG. 4 according to an embodiment of this disclosure. In graphs of FIGS. 4 and 5, an x-axis may indicate time, and a y-axis may indicate amplitude.

Referring to FIG. 3, in operation 1010, an electronic device 501 may receive a first signal, a second signal, and a third signal. The electronic device 501 may receive the second signal that is received after a first time elapses after the first signal is received from an input device (e.g., the input device 550 of FIG. 2). The electronic device 501 may receive the third signal that is received after a second time elapses after the second signal is received from the input device.

Figure 4:
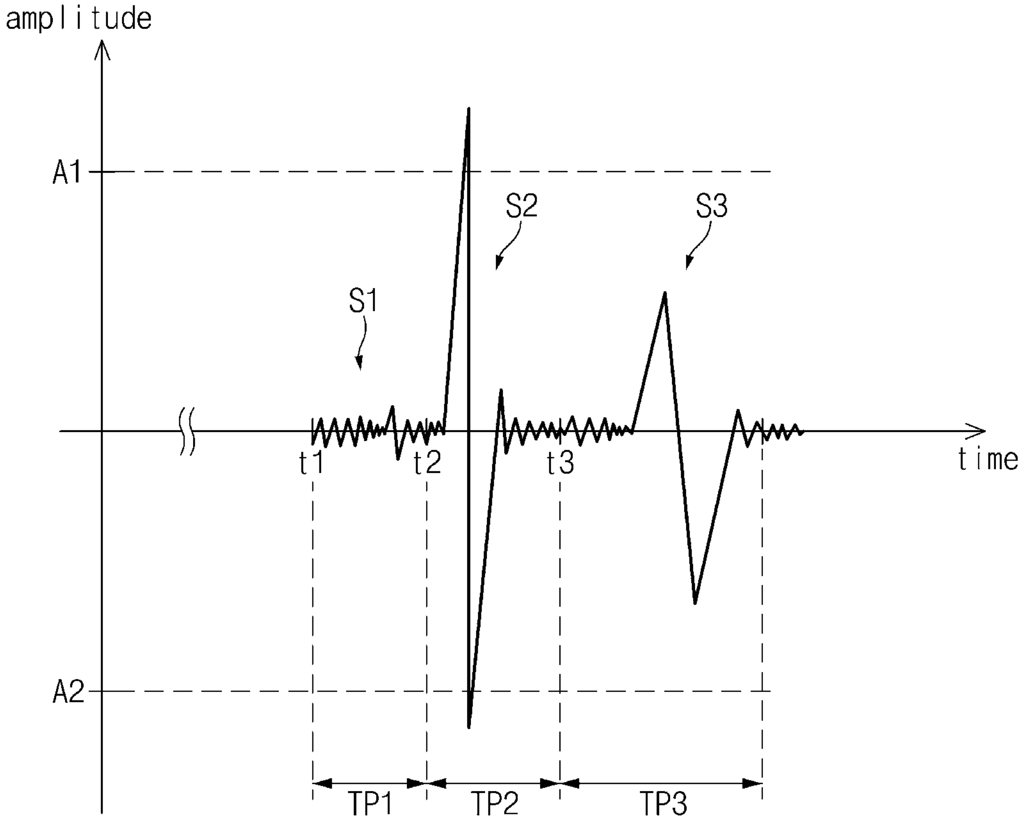
FIG. 4 illustrates a diagram describing a first signal, a second signal, and a third signal, according to an embodiment of this disclosure.

Referring to FIG. 4, signals S1, S2, and S3 (e.g., input signals) may be received by the electronic device 501. In certain embodiments, the signals S1, S2, and S3 may be a signal, which is received by an input device (e.g., the input device 550 of FIG. 2) from the outside and which is preprocessed by the input device and/or a separate circuit and transmitted to a processor (e.g., the processor 520 of FIG. 2). In certain embodiments, the signals S1, S2, and S3 may be signals transmitted from the input device to the processor without being preprocessed by the input device and/or the separate circuit.

The signals S1, S2, and S3 may include the first signal S1, the second signal S2, and the third signal S3. The first signal S1 may be a part of the signals S1, S2, and S3, which is received during a first time TP1 from a first time point t1. The second signal S2 may be a part of the signals S1, S2, and S3, which is received during a second time TP2 from a second time point t2. The third signal S3 may be a part of the signals S1, S2, and S3, which is received during a third time TP3 from a third time point t3.

FIG. 4 illustrates that the second time point t2 is started after the first time TP1 has elapsed from the first time point t1, but is not limited thereto. For example, a fourth signal may be inserted between the first time point t1 and the second time point t2. In this case, after the first signal S1 is received during the first time TP1 from the first time point t1, the fourth signal may be received during the fourth time. Furthermore, after the fourth signal is received during the fourth time, the second signal S2 may be received during the second time TP2 from the second time point t2.

In certain embodiments, the electronic device 501 may receive only a signal having amplitude equal to or smaller than amplitude (A1, A2). For example, a portion of a signal having amplitude greater than the amplitude (A1, A2) may be clipped. For example, the second signal S2 may have amplitude greater than the amplitude (A1, A2). When the second signal S2 is received by the electronic device 501, a portion, which has amplitude greater than the amplitude (A1, A2), in the second signal S2 may be clipped and received. For example, when the second signal S2 is received by the electronic device 501, only a portion, which is equal to or smaller than the amplitude (A1, A2), in the second signal S2 may be received.

Referring to FIG. 3, in operation 1030, the electronic device 501 may identify a first filter value of the first signal. For example, the first filter value may be associated with a filter used to remove noise from the first signal.

In operation 1050, the electronic device 501 may compare a level of the second signal with a first threshold value. For example, the electronic device 501 may divide the second signal into unit sections. The electronic device 501 may compare the first threshold value with a level of the portion of the second signal, which corresponds to a unit section, for each unit section.

In certain embodiments, the level may refer to the intensity of a signal. For example, the electronic device 501 may compare the first threshold value with the intensity of the portion of the second signal corresponding to a unit section for each unit section.

In certain embodiments, the level may refer to a probability value that abnormal noise is present in the portion of the signal corresponding to the unit section. For example, the electronic device 501 may compare the first threshold value with a probability value that abnormal noise is present in the portion of the second signal corresponding to a unit section, for each unit section.

Figure 5:
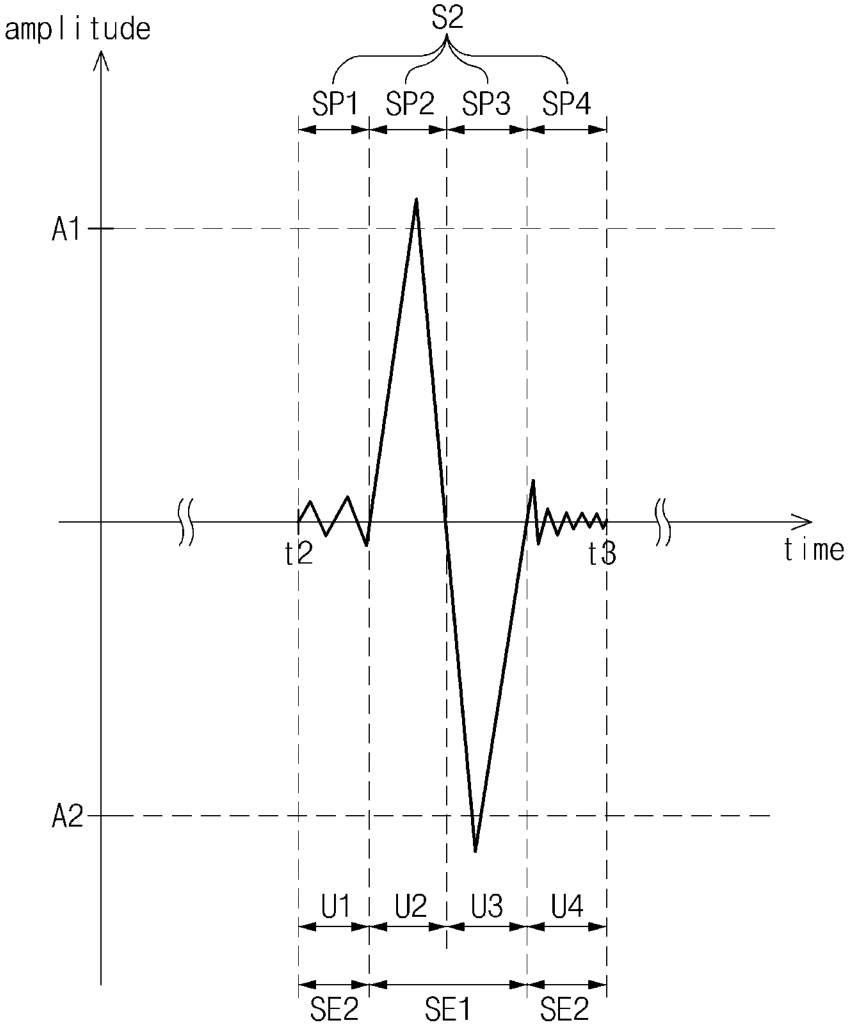
FIG. 5 illustrates a diagram describing a unit section and a first section of the second signal as shown in of FIG. 4 according to an embodiment of this disclosure.

Referring to FIG. 5, the electronic device 501 may divide the second signal S2 into unit sections U1, U2, U3, and U4. The electronic device 501 may compare a level of the second signal S2 with the first threshold value for each of the unit sections U1, U2, U3, and U4. For example, the electronic device 501 may compare the first threshold value with a level of each of a first portion SP1, a second portion SP2, a third portion SP3, and a fourth portion SP4 of the second signal S2, which respectively correspond to the first unit section U1, the second unit section U2, the third unit section U3, and the fourth unit section U4.

Referring to FIG. 3, in operation 1070, the electronic device 501 may identify the first information based on a fact that a level of the second signal is greater than the first threshold value (e.g., YES in operation 1050).

The electronic device 501 may identify a first section including at least one unit section, which has a level greater than the first threshold value, in the second signal. The electronic device 501 may identify a second section including at least one unit section, which has a level smaller than the first threshold value, in the second signal.

The electronic device 501 may identify first information based on a fact that a level of the portion of the second signal corresponding to the first section is greater than the first threshold value. The first information may include information indicating that abnormal noise is present in the first section of the second signal. The abnormal noise may mean that a level of the portion of the second signal, which corresponds to the unit section, is greater than the first threshold value.

The electronic device 501 may identify that abnormal noise is not present in the second section of the second signal based on a fact that a level of the portion of the second signal, which corresponds to the second section, is smaller than the first threshold value.

For example, the first signal and the third signal may be signals that do not include a unit section having a level greater than the first threshold value.

In certain embodiments, the first information may be expressed as a flag.

In certain embodiments, the first information may be expressed as a probability value that abnormal noise is present in the first section of the second signal.

Referring to FIG. 5, the electronic device 501 may identify that each of a level of the second portion SP2 of the second signal S2 corresponding to the second unit section U2 and a level of the third portion SP3 of the second signal S2 corresponding to the third unit section U3 are greater than the first threshold value. The electronic device 501 may identify a first section SE1 including the second unit section U2 and the third unit section U3. The electronic device 501 may identify that each of a level of the first portion SP1 of the second signal S2 corresponding to the first unit section U1 and a level of the fourth portion SP4 of the second signal S2 corresponding to the fourth unit section U4 is smaller than the first threshold value. The electronic device 501 may identify a second section SE2 including the first unit section U1 and the fourth unit section U4. The electronic device 501 may identify the first information indicating that abnormal noise is present in the first section SE1 of the second signal S2.

Referring to FIG. 3, in operation 1090, the electronic device 501 may perform first filter value-based filtering on the third signal based on the first information. For example, the electronic device 501 may perform filtering on the first signal and the third signal. For example, the electronic device 501 may remove noise included in the first signal and the third signal through the filtering. The electronic device 501 may perform first filter value-based filtering on the first signal.

The electronic device 501 according to the embodiment disclosed in this specification may perform filtering on the third signal based on the first filter value applied to the first signal instead of a filter value applicable to the second signal, based on a fact that a section (e.g., the first section SE1) including abnormal noise included in the second signal that is a signal received before the third signal is received (e.g., based on the first information). In this case, the third signal may be prevented from being removed by applying a filter value, which is applicable to the second signal, to the third signal and performing filtering.

In operation 1100, the electronic device 501 may identify a second filter value of the second signal based on a fact that a level of the second signal is less than the first threshold value (e.g., NO in operation 1050).

The electronic device 501 may identify that a unit section having a level greater than the first threshold value is not included in the second signal. The electronic device 501 may identify that abnormal noise is not present in the second signal, based on a fact that a unit section having a level greater than the first threshold value is not included in the second signal. The electronic device 501 may identify the second filter value of the second signal based on a fact that abnormal noise is not present in the second signal.

In operation 1110, the electronic device 501 may perform second filter value-based filtering on the third signal. For example, the electronic device 501 may perform second filter value-based filtering on the third signal based on a fact that abnormal noise is not present in the second signal received before the third signal is received.

Hereinafter, an operation of an electronic device (e.g., the electronic device 501 of FIG. 2) according to an embodiment disclosed in this specification will be described with reference to FIG. 6. For clarity of description, details the same as the above-described details may be briefly described or omitted.

Hereinafter, it is assumed that the electronic device 501 of FIG. 2 performs a process of FIG. 6. The operation described as being performed by the electronic device 501 may be implemented with instructions capable of being performed (or executed) by the processor 520 of the electronic device 501. The instructions may be stored in, for example, a computer-readable recording medium or the memory 530 of the electronic device 501 illustrated in FIG. 2.

Figure 6:
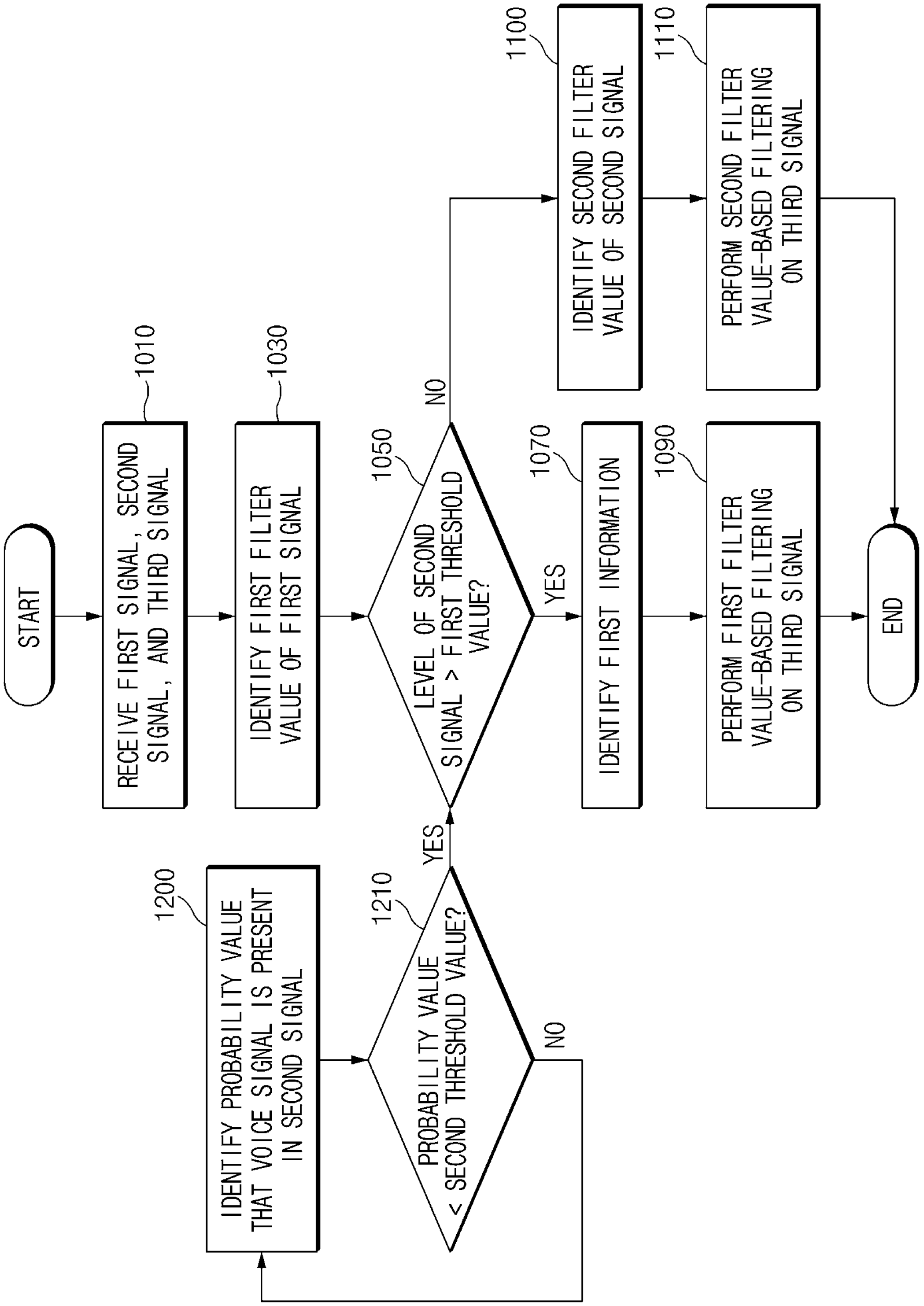
FIG. 6 illustrates a flowchart of an operation according to an embodiment of this disclosure.

FIG. 6 illustrates a flowchart of an operation according to an embodiment of this disclosure.

Referring to FIG. 6, in operation 1200, the electronic device 501 may identify a probability value that a voice signal is present in a second signal. In certain embodiments, the electronic device 501 may receive the probability value that a voice signal is present in the second signal, from one of a processor (e.g., the processor 520 of FIG. 2) or a separate circuit.

In operation 1210, the electronic device 501 may compare a second threshold value with the probability value that the voice signal is present in the second signal.

When the probability value that the voice signal is present in the second signal is greater than the second threshold value, the electronic device 501 may perform operation 1200.

When the probability value that the voice signal is present in the second signal is less than the second threshold value, the electronic device 501 may perform operation 1050. For example, the electronic device 501 may identify the first information (e.g., operation 1070), based on a fact that the probability value that the voice signal is present in the second signal is less than the second threshold value, and a level of the portion of the second signal corresponding to the first section is greater than a first threshold value.

According to an embodiment disclosed in this specification, an abnormal noise determining method of an electronic device 501 may include identifying a first filter value of a first signal received from the electronic device 501, receiving a second signal, which is received after a first time elapses after the first signal is received, and a third signal, which is received after a second time elapses after the second signal is received, comparing a level of the second signal with a first threshold value for each unit section of the second signal, identifying first information indicating that abnormal noise is present in a first section of the second signal, based on a fact that a level of a portion of the second signal corresponding to the first section including the at least one unit section is greater than the first threshold value, and performing filtering based on the first filter value of the first signal on the third signal based on the first information.

In certain embodiments, the method may further include identify intensity of the portion of the second signal corresponding to the first section. The level may be the intensity of the portion of the second signal corresponding to the first section.

In certain embodiments, the method may further include identifying a probability value that the abnormal noise is present in the portion of the second signal corresponding to the first section. The level may be the probability value.

In certain embodiments, the identifying of the first information may include identifying a probability value that the abnormal noise is present in the first section of the second signal.

In certain embodiments, the method may further include identifying a probability value that a voice signal is present in the second signal and comparing the probability value with a second threshold value. The identifying of the first information may include identifying the first information based on a fact that the level of the portion of the second signal corresponding to the first section is greater than the first threshold value and the probability value is less than the second threshold value.

In certain embodiments, the method may further include performing filtering based on a second filter value of the second signal on the third signal based on a fact that the level of the portion of the second signal corresponding to the first section is less than the first threshold value.

In certain embodiments, the method may further include performing filtering based on the first filter value on the first signal.

Various embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions “A or B”, “at least one of A and B”, “at least one of A or B”, “A, B, or C”, “at least one of A, B, and C”, and “at least one of A, B, or C” may include any and all combinations of one or more of the associated listed items. The terms, such as “first” or “second” may be used to simply distinguish the corresponding component from the other component, but do not limit the corresponding components in other aspects (e.g., importance or order). When a component (e.g., a first component) is referred to as being “coupled with/to” or “connected to” another component (e.g., a second component) with or without the term of “operatively” or “communicatively”, it may mean that a component is connectable to the other component, directly (e.g., by wire), wirelessly, or through the third component.

The term “module” used herein may include a unit, which is implemented with hardware, software, or firmware, and may be interchangeably used with the terms “logic”, “logical block”, “part”, or “circuit”. The “module” may be a minimum unit of an integrated part or may be a minimum unit of the part for performing one or more functions or a part thereof. For example, according to an embodiment, the module may be implemented in the form of an application-specific integrated circuit (ASIC).

Various embodiments of the disclosure may be implemented with software including one or more instructions stored in a storage medium (e.g., the embedded memory 150 or external memory) readable by a machine (e.g., the user terminal 100). For example, the processor (e.g., the processor 160) of the machine (e.g., the user terminal 100) may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PLAYSTORE), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to an embodiment disclosed in this specification, a computer-readable storage medium may store instructions, when executed by an electronic device 501, cause the electronic device 501 to identify a first filter value of a first signal received from the electronic device 501, to receive a second signal, which is received after a first time elapses after the first signal is received, and a third signal, which is received after a second time elapses after the second signal is received, to compare a level of the second signal with a first threshold value for each unit section of the second signal, to identify first information indicating that abnormal noise is present in a first section of the second signal, based on a fact that a level of a portion of the second signal corresponding to the first section including the at least one unit section is greater than the first threshold value, and to perform filtering based on the first filter value of the first signal on the third signal based on the first information.

In certain embodiments, the instructions may cause, when executed by an electronic device 501, the electronic device 501 to identify intensity of the portion of the second signal corresponding to the first section and to compare the level, which is the intensity of the portion of the second signal corresponding to the first section, with the first threshold value.

In certain embodiments, the instructions may cause, when executed by an electronic device 501, the electronic device 501 to identify a probability value that the abnormal noise is present in the portion of the second signal corresponding to the first section, and to compare the level, which is the probability value, with the first threshold value.

In certain embodiments, the instructions may cause, when executed by an electronic device 501, the electronic device 501 to identify a probability value that the abnormal noise is present in the first section of the second signal, as the first information based on a fact that the level of the portion of the second signal corresponding to the first section is greater than the first threshold value.

In certain embodiments, the instructions may cause, when executed by an electronic device 501, the electronic device 501 to identify a probability value that a voice signal is present in the second signal, to compare the probability value with a second threshold value, and to identify the first information based on a fact that the level of the portion of the second signal corresponding to the first section is greater than the first threshold value and the probability value is less than the second threshold value.

According to various embodiments, each component (e.g., a module or a program) of the above-described components may include a single entity or a plurality of entities. According to various embodiments, one or more components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, programs, or other components may be executed by a successive method, a parallel method, a repeated method, or a heuristic method. Alternatively, at least one or more of the operations may be executed in another order or may be omitted, or one or more operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:

an input device;

a processor; and a memory operatively connected to the input device and the processor, wherein the memory stores instructions that, when executed, cause the processor to:

identify a first filter value of a first signal received from the input device;

receive a second signal after a first time elapses after the first signal is received, from the input device;

receive a third signal after a second time elapses after the second signal is received, from the input device;

identify a probability of a voice presence from the second signal;

based on the identified probability being lower than a second threshold value, compare a level, which indicates an intensity of the second signal, of the second signal with a first threshold value for each of at least one unit section of the second signal;

identify first information indicating that abnormal noise is present in a first section of the second signal, based on a level of a portion of the second signal, corresponding to the first section including the at least one unit section, being greater than the first threshold value and the identified probability being lower than the second threshold value;

perform filtering on the third signal based on the first filter value of the first signal according to the first information, and based on the identified probability being equal to or greater than the second threshold value or the level of the second signal being lower than the first threshold value, perform filtering on the third signal based on a second filter value for noise suppression of the second signal.

2. The electronic device of claim 1, wherein the instructions cause the processor to:

identify a probability value that the abnormal noise is present in the portion of the second signal corresponding to the first section, and compare the level, which is the probability value, to the first threshold value.

3. The electronic device of claim 1, wherein the instructions cause the processor to perform filtering based on the first filter value on the first signal.

4. A method of an electronic device for abnormal noise determination, the method comprising:

receiving a first signal;

identifying a first filter value of the first signal received from the electronic device;

receiving a second signal and a third signal, wherein the second signal is received after a first time elapses after the first signal is received, and the third signal is received after a second time elapses after the second signal is received;

identifying a probability of a voice presence from the second signal;

based on the identified probability being lower than a second threshold value, comparing a level, which indicates an intensity of the second signal, of the second signal with a first threshold value for each of at least one unit section of the second signal;

identifying first information indicating that abnormal noise is present in a first section of the second signal, based on a level of a portion of the second signal, corresponding to the first section including the at least one unit section, being greater than the first threshold value and the identified probability being lower than the second threshold value;

performing filtering on the third signal based on the first filter value of the first signal according to the first information; and based on the identified probability being equal to or greater than the second threshold value or the level of the second signal being lower than the first threshold value, performing filtering on the third signal based on a second filter value for noise suppression of the second signal.

5. The method of claim 4, wherein the identifying of the first information comprises:

identifying a probability value that the abnormal noise is present in the first section of the second signal.

6. The method of claim 4, further comprising performing filtering based on the first filter value on the first signal.

7. A non-transitory machine-readable medium storing instructions that when executed cause at least one processor of an electronic device to:

identify a first filter value of a first signal received from an input device;

receive a second signal after a first time elapses after the first signal is received, from the input device;

receive a third signal after a second time elapses after the second signal is received, from the input device;

identify a probability of a voice presence from the second signal;

based on the identified probability being lower than a second threshold value, compare a level, which indicates an intensity of the second signal, of the second signal with a first threshold value for each of at least one unit section of the second signal;

identify first information indicating that abnormal noise is present in a first section of the second signal, based on a level of a portion of the second signal, corresponding to the first section including the at least one unit section, being greater than the first threshold value and the identified probability being lower than the second threshold value;

perform filtering on the third signal based on the first filter value of the first signal according to the first information, and based on the identified probability being equal to or greater than the second threshold value or the level of the second signal being lower than the first threshold value, perform filtering on the third signal based on a second filter value for noise suppression of the second signal.

8. The non-transitory machine-readable medium of claim 7, further storing instructions that when executed cause the at least one processor to:

identify a probability value that the abnormal noise is present in the portion of the second signal corresponding to the first section, and compare the level, which is the probability value, to the first threshold value.

* * * * *